(12) United States Patent
Rassool et al.

(10) Patent No.: US 7,817,608 B2
(45) Date of Patent: Oct. 19, 2010

(54) TRANSITIONING TO SECURE IP COMMUNICATIONS FOR ENCODING, ENCAPSULATING, AND ENCRYPTING DATA

(75) Inventors: Reza P. Rassool, Stevenson Ranch, CA (US); Glenn A. Morten, Bellevue, WA (US); Brian A. Baker, Mercer Island, WA (US)

(73) Assignee: Widevine Technologies, Inc., Seattle, WA (US)

( * ) Notice: Subject to any disclaimer, the term of this patent is extended or adjusted under 35 U.S.C. 154(b) by 1078 days.

(21) Appl. No.: 11/470,574

(22) Filed: Sep. 6, 2006

(65) Prior Publication Data

US 2007/0104097 A1 May 10, 2007

Related U.S. Application Data

(60) Provisional application No. 60/720,314, filed on Sep. 23, 2005.

(51) Int. Cl.
*H04Q 7/24* (2006.01)
(52) U.S. Cl. ...................... 370/338; 375/240
(58) Field of Classification Search .................. 370/338
See application file for complete search history.

(56) References Cited

U.S. PATENT DOCUMENTS

| | | | |
|---|---|---|---|
| 4,535,355 A | 8/1985 | Arn et al. | |
| 4,694,489 A | 9/1987 | Frederiksen | |
| 5,067,035 A | 11/1991 | Kudelski et al. | |
| 5,134,656 A | 7/1992 | Kudelski | |
| 5,144,663 A | 9/1992 | Kudelski et al. | |
| 5,375,168 A | 12/1994 | Kudelski | |
| 5,539,450 A | 7/1996 | Handelman | |
| 5,590,200 A | 12/1996 | Nachman et al. | |
| 5,592,212 A | 1/1997 | Handelman | |
| 5,621,799 A | 4/1997 | Katta et al. | |
| 5,640,546 A | 6/1997 | Gopinath et al. | |
| 5,666,412 A | 9/1997 | Handelman et al. | |
| 5,684,876 A | 11/1997 | Pinder et al. | |
| 5,742,599 A | 4/1998 | Lin et al. | |
| 5,758,257 A | 5/1998 | Herz et al. | |
| 5,774,527 A | 6/1998 | Handelman et al. | |
| 5,774,546 A | 6/1998 | Handelman et al. | |
| 5,799,089 A | 8/1998 | Kuhn et al. | |

(Continued)

FOREIGN PATENT DOCUMENTS

EP             658054 B1         6/1995

(Continued)

OTHER PUBLICATIONS

Wu, Tsung-Li et al., "Selective Encryption and Watermarking of MPEG Video (Extended Abstract)," Feb. 17, 1997 10 pgs., International Conference on Image Science, Systems, and Technology.

(Continued)

*Primary Examiner*—Creighton Smith
(74) *Attorney, Agent, or Firm*—Frommer Lawrence & Haug LLP; David W. Foster

(57) ABSTRACT

An apparatus, system, and method is directed to transcoding broadcast content, such as in a DVB, ATSC, and MPEG based network, to secure content suitable for an Internet Protocol (IP) based network. In one embodiment, a single multifunctional convergence appliance is employed to enable such transcoding actions as encryption, encoding, and/or encapsulation. For example, in one embodiment, an MPEG transport stream associated with the broadcast content may be transcoded to an IP-based transport stream. In addition, the transport stream may be decrypted, transrated to another rate, and re-encrypted using a different control word for re-encrypting, but a same service key to encrypt the different control word. The system is also enabled to transcode content formatted for the IP-based network to a content format suitable for the broadcast network.

13 Claims, 3 Drawing Sheets

U.S. PATENT DOCUMENTS

| | | |
|---|---|---|
| 5,805,705 A | 9/1998 | Gray et al. |
| 5,870,474 A | 2/1999 | Wasilewski et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,625 A | 7/1999 | Davies |
| 5,920,861 A | 7/1999 | Hall et al. |
| 5,922,208 A | 7/1999 | Demmers |
| 5,923,666 A | 7/1999 | Gledhill et al. |
| 5,933,498 A | 8/1999 | Schneck et al. |
| 5,939,975 A | 8/1999 | Tsuria et al. |
| 5,943,422 A | 8/1999 | Van Wie et al. |
| 5,949,876 A | 9/1999 | Ginter et al. |
| 5,982,891 A | 11/1999 | Ginter et al. |
| 5,991,399 A | 11/1999 | Graunke et al. |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,035,037 A | 3/2000 | Chaney |
| 6,038,433 A | 3/2000 | Vegt |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,138,119 A | 10/2000 | Hall et al. |
| 6,157,721 A | 12/2000 | Shear et al. |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,226,794 B1 | 5/2001 | Anderson, Jr. et al. |
| 6,237,786 B1 | 5/2001 | Ginter et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelmann et al. |
| 6,314,409 B2 | 11/2001 | Schneck et al. |
| 6,314,572 B1 | 11/2001 | LaRocca et al. |
| 6,334,213 B1 | 12/2001 | Li |
| 6,363,488 B1 | 3/2002 | Ginter et al. |
| 6,389,402 B1 | 5/2002 | Ginter et al. |
| 6,405,369 B1 | 6/2002 | Tsuria |
| 6,409,080 B2 | 6/2002 | Kawagishi |
| 6,409,089 B1 | 6/2002 | Eskicioglu |
| 6,415,031 B1 | 7/2002 | Colligan et al. |
| 6,427,140 B1 | 7/2002 | Ginter et al. |
| 6,449,367 B2 | 9/2002 | Van Wie et al. |
| 6,449,719 B1 | 9/2002 | Baker |
| 6,459,427 B1 | 10/2002 | Mao et al. |
| 6,466,670 B1 | 10/2002 | Tsuria et al. |
| 6,505,299 B1 | 1/2003 | Zeng et al. |
| 6,587,561 B1 | 7/2003 | Sered et al. |
| 6,618,484 B1 | 9/2003 | Van Wie et al. |
| 6,629,243 B1 | 9/2003 | Kleinman et al. |
| 6,634,028 B2 | 10/2003 | Handelmann |
| 6,640,304 B2 | 10/2003 | Ginter et al. |
| 6,651,170 B1 | 11/2003 | Rix |
| 6,654,420 B1 | 11/2003 | Snook |
| 6,654,423 B2 | 11/2003 | Jeong et al. |
| 6,658,568 B1 | 12/2003 | Ginter et al |
| 6,668,325 B1 | 12/2003 | Collberg et al. |
| 2002/0001385 A1 | 1/2002 | Kawada et al. |
| 2002/0015498 A1 | 2/2002 | Houlberg et al. |
| 2002/0021805 A1 | 2/2002 | Schumann et al. |
| 2002/0089410 A1 | 7/2002 | Janiak et al. |
| 2002/0104004 A1 | 8/2002 | Couillard |
| 2002/0141582 A1 | 10/2002 | Kocher et al. |
| 2003/0007568 A1 | 1/2003 | Hamery et al. |
| 2004/0031058 A1* | 2/2004 | Reisman ..................... 725/112 |
| 2004/0161031 A1* | 8/2004 | Kwentus et al. ............. 375/240 |
| 2006/0077310 A1* | 4/2006 | Wang et al. ................. 348/838 |
| 2006/0133336 A1* | 6/2006 | Oh et al. ..................... 370/338 |
| 2008/0043642 A1* | 2/2008 | Park et al. ................... 370/259 |

FOREIGN PATENT DOCUMENTS

| | | |
|---|---|---|
| EP | 714204 B1 | 5/1996 |
| EP | 0886409 A2 | 12/1998 |
| WO | WO-96/06504 A1 | 2/1996 |
| WO | WO-96/32702 A1 | 10/1996 |
| WO | WO-99/30499 A1 | 6/1999 |
| WO | WO-99/54453 A1 | 10/1999 |
| WO | WO-01/35571 A1 | 5/2001 |
| WO | WO-01/93212 A2 | 12/2001 |
| WO | WO-02/21761 A2 | 3/2002 |

OTHER PUBLICATIONS

Yoshida, Kazuhiro, et al., "A Continuous-media Communication Method for Minimizing Playback Interruptions", IS&T/SPIE Conference on Visual Communications and Immage Processing, Jan. 1999, San Jose, California, vol. 3653.

"Irdeto Access & Optibase create Strategic Alliance", Press Release, Optibase, pp. 1-2, Dec. 14, 2000. http://www.optibase.com/html/news/December_14_2000.html.

Hunter, J., et al., "A Review of Video Streaming Over the Internet", DSTC Technical Report TR97-10, pp. 1-28., Aug. 1997.

Blumenfeld, Steven, "System Security, Streaming Media", Broadcast Engineering magazine, pp. 1-2, Oct. 2001.

Eskiciouglu, A. and Delp, E., "An overview of multimedia content protection in consumer electronics devices", SP:IC, 16(7): pp. 681-699, Apr. 2001.

Forrest, S., "Research Projects", pp. 1-3, Dec. 2, 2003. http://www.cs.unm.edu/~forrest/projects.html.

Schulzrinne, H., et al., Real Time Streaming Protocol (RTSP), RFC 2326, pp. 1-86, Apr. 1998.

Cheng, H.C.H., "Partial Encryption for Image and Video Communication", Department of Computing Science, University of Alberta, pp. 1-87, Fall, 1998.

Balthrop, Justin, et al., "Coverage and Generalization in an Artificial Immune System", Proceedings of Genetic and Evolutionary Computation Conference (GECCO), pp. 1-8, 2002.

Griwodz, Carsten, "Video Protection by Partial Content Corruption", Multimedia and Security Workshop at ACM Multimedia, Bristol, UK, pp. 1-5, Sep. 1998.

"Establishing Interconnectivity among Various Makers' Products through Standardization of VOD Protocol", NTT Corporation Press Release, Sep. 27, 2002. http://www.ntt.co.jp/news/news02e/0209/020927.html.

Intelligent Systems for Finance and Business, Goonatilake, Suran, ed. et al., Chapters 2-10, pp. 31-173, 1995.

Spanos, George, et al., "Performance Study of a Selective Encryption Scheme for the Security of Networked, Real-Time Video", Proceedings of the 4th ICCN, Las Vegas, NV, pp. 2-10, Sep. 1995.

"Riding the Media Bits Protecting content", chiariglione.org, 4 pages, Aug. 8, 2003. Can be found at http://chiariglione.org/ride/protecting_content/protecting_content.htm.

"Technologies and Services on Digital Broadcasting (6)—Scrambling (Conditional Access System)", Broadcast Technology No. 12, pp. 10-13, Autumn 2002.

Hewitt, Rod, "TSReader-Analyze, Decode and Record MPEG-2 Transport Streams", 36 pages, Nov. 24, 2003. Can be found at http://www.coolstf.com/mpeg/.

* cited by examiner

TRANSITIONING TO SECURE IP COMMUNICATIONS FOR ENCODING, ENCAPSULATING, AND ENCRYPTING DATA

CROSS-REFERENCE TO RELATED APPLICATIONS

The present application claims benefit of provisional application Ser. No. 60/720,314 entitled "System And Method For Transitioning To Secure IP Communications," filed on Sep. 23, 2005, the benefit of the earlier filing date of which is hereby claimed under 35 U.S.C. §119 (e) and 37 C.F.R. §1.78, and which is further incorporated by reference.

FIELD OF THE INVENTION

This invention relates generally to secure communications, and more particularly but not exclusively, to employing a multifunctional convergence appliance to enable intelligent encoding, encapsulating, and/or encryption to transcode various media content input signals for use in secure IP content distribution.

BACKGROUND OF THE INVENTION

Television and similar broadcast technologies have made tremendous progress over the years. Apart from gradually improving the quality of the send and receive equipment, there has been the introduction of color broadcasts, high definition television, and recently digital television.

Today's digital television (DTV) is delivered over a dedicated broadcast network, by satellite, cable, and terrestrial transmission. The more widely used transport based standard employed for these broadcast networks is Motion Pictures Expert Group (MPEG). MPEG is an encoding and compression standard for digital broadcast content. MPEG provides compression support for television quality transmission of video broadcast content. Moreover, MPEG provides for compressed audio, control, and even user broadcast content. It is for example, used in the Digital Video Broadcasting (DVB), and Advanced Television Systems Committee (ATSC) standards for digital television content. MPEG is also used in storage of broadcast content on Digital Versatile Discs (DVD).

However, since the growth of the Internet in recent years, there is an increased desire for more services, such as high quality broadcast content to be offered over the Internet, beyond the usual content for which the Internet was first designed. The transmission of broadcast content over an Internet Protocol (IP) based network can open up new opportunities for both a consumer and a content owner.

The application or trend of taking content originated within the DTV domain for redistribution within the IP domain is known as convergence. In general, convergence calls for the seamless flow of content between DTV and IP domains.

There remain several problems however, with transmission of such DTV content over IP-based networks, because the current transport standard for broadcast content is not compatible with current IP-based transport standards. For example, limited network bandwidth on some IP networks, may call for the use of more efficient compression/decompression techniques (CODECs) and/or lower bitrate transmissions.

Providing broadcast content over the Internet also creates a tremendous risk for piracy of the broadcast content. Such risk for piracy may arise at any place along the communication path that the broadcast content is exposed. Without appropriate protection, the broadcast content can be illicitly intercepted, stolen, copied, and redistributed, thus depriving broadcast content owners of their profits. In order to transcode or transrate content, the content must be in the clear. This may therefore expose the content for possible piracy, at least until it may be again re-encrypted. So the transcoding device must be secured. Additionally the content must be re-encrypted to secure the transcoded retransmission. Current approaches to protecting broadcast content employ security mechanisms, such conditional access systems (CAS), which are different and often incompatible with IP-based network security mechanisms, such as Digital Rights Management (DRM). Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
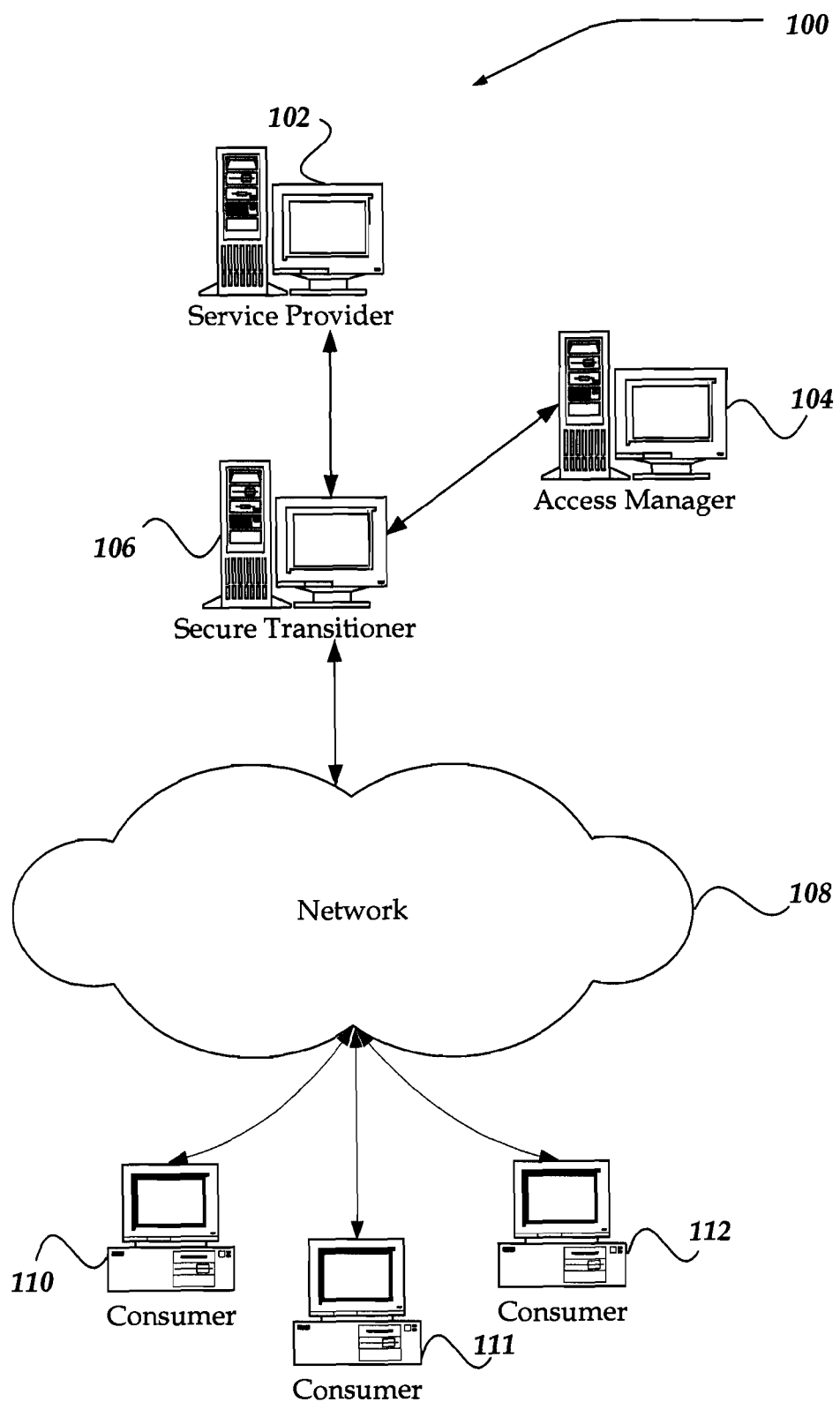
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." The term "consumer" means an individual or entity that desires to retrieve content from a service provider.

Briefly stated, the present invention is directed towards a system and method for providing integrated secure convergence of content and signals between the television domain and the Internet protocol (IP) domain. Content may be produced in the TV domain and may exist as baseband video and audio signals stored on tape or supplied live through wires. For IPTV distribution the content may be moved from the TV domain to the IP domain wherein it may exist as encoded files or supplied live as streams on an IP network. Convergence includes the transitioning signals between these two domains. While most common transitions are forward from TV to IP there are also applications that may have IP signals that are to be returned to the TV domain for monitoring, processing, or distributing into traditional networks. Security is a substantial problem to solve when performing convergence operations. Thus, the invention combines encoding and encapsulation functionality with encryption logic to yield a secure convergence appliance. The various input formats include, but are not limited to DVB, ATSC, digital Serial Digital Interface (SDI), S-Video, Audio Engineering Society/European Broadcasting Union (AES/EBU) formats, Sony/Philips Digital Interface Format (S/PDIF), or the like. A secure appliance may be employed to select any of a variety of input signals. A menu or other interface may also enable an administrator or the like, to select a mode of processing to be performed upon the selected input signal(s), including, for example, filtering of program steams (PID filtering), rate shaping, encoding, encapsulation, and/or encryption. A format for the output signal(s) may also be selected, including, digital cable television (IP distribution of DVB) signal, MPEG transport streams over IP, IPTV, or even encrypted digital SDI. In one embodiment, an MPEG transport stream may be transcoded to an IP-based transport stream. In addition, a program stream associated with the MPEG transport stream may be selectively encrypted on the fly. In another embodiment, MPEG transport and program streams may be securely encapsulated in an envelope for communication over an IP-based network.

Illustrative Environment

FIG. 1 shows a functional block diagram illustrating one embodiment of operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes service provider 102, access manager 104, secure transitioner 106, network 108, and Consumers 110-112. Secure transitioner 106 is in communication with service provider 102. Secure transitioner 106 is also in communication with access manager 104 and network 108. Moreover, Consumers 110-112 are in communication with network 108.

Service provider 102 includes any individual or entity that is directed at providing broadcast content to consumers 110-112. Service provider 102 may include content owners such as producers, developers, and owners of network content. Service provider 102 may also include television (telcos) operators and owners, cable owners, satellite operators and owners, and the like. Service provider 102 traditionally provides Digital Video Broadcasting (DVB), Advanced Television Systems Committee (ATSC), and Motion Pictures Expert Group (MPEG) transport based broadcast content. However, the invention is not so limited, and service provider 102 may provide content using a variety of other formats, and/or mechanisms, including digital Serial Digital Interface (SDI), S-Video, Audio Engineering Society/European Broadcasting Union (AES/EBU) formats, Sony/Phillips Digital Interface Format (S/PDIF), or the like. Moreover, such broadcast content may include, but is not limited to video, audio, graphical, text, interactive TV (iTV) content, pay for view (PoV), or the like.

Service provider 102 may employ any of a variety of devices to enable providing of the broadcast content, including, but not limited to personal computers, desktop computers, multiprocessor systems, network appliance, microprocessor-based electronics, network PCs, servers, or the like.

Secure transitioner 106 is described below in more detail in conjunction with FIG. 2. Briefly, however, secure transitioner 106 includes a combination of hardware and software configured to transition a broadcast based format, such as MPEG, that is associated with broadcast content, to a format useable in an IP-based delivery network, and to selectively encrypt at least some of the broadcast content virtually on the fly. Such transitioning includes transcoding of broadcast content into IP-based format, providing an IP encapsulation of the broadcast content, and the like. Secure transitioner 106 may also be configured to receive secure IP-based content and provide broadcast content, typically in an MPEG based transport format.

Although secure transitioner 106 is shown downstream of service provider 102, it may be employed in a variety of locations within system 100 of FIG. 1. For example, secure transitioner 106 may be located at the head-end of service provider 102. Transitioner 106 may also be employed within network 108, such as within a relay station, to provide secure transitioning of broadcast content for communications across incompatible network components.

In one embodiment, secure transitioner 106 may be implemented as a network appliance; however, the invention is not so limited. For example, secure transitioner 106 may also be implemented on personal computers, desktop computers, multiprocessor systems, microprocessor-based electronics, network PCs, servers, or the like.

Access Manager 104 includes any software and related hardware configured to provide selective access and related services to IP and broadcast formatted content based on validated authorization. Access manager 104 may include, but is not limited to providing Conditional Access System (CAS) services, Digital Rights Management System (DRM) services, and similar services configured to manage electronic keys, entitlements, rights, and the like for selective access to content. For example, access manager 104 may include a smart card that is directed to provide Consumers 110-112 selective accesses to secure IP content. Although not shown in FIG. 1, access manager 104 may also be in communication with service provider 102 and/or consumers 110-112. In one embodiment, access manager 104 includes several components, with at least one component arranged to reside near consumers 110-112. Access manager 104 also may enable consumers 110-112 to interactively communicate with service provider 102 in a secure manner.

Network 108 can employ any form of computer readable media for communicating information from one electronic device to another. Network 108 can include the Internet in addition to local area networks (LANs), wide area networks (WANs), direct or indirect connections, such as through a universal serial bus (USB) port, other forms of computer-readable media, or any combination thereof. On an interconnected set of LANs, including those based on differing architectures and protocols, a router acts as a link between LANs, enabling messages to be sent from one to another.

Also, communication links within network 108 typically includes fiber, twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, fiber, Asymmetric Digital Subscriber Lines (ADSL), Video Digital Subscriber Lines (VDSL), or other communications links known to those skilled in the art. Furthermore, remote computers and other related electronic devices can be remotely connected to other networks via a modem and telephone link, providing a modulated data signal such as a carrier wave or other transport mechanism or information delivery media.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media. Carrierless AM/PM (CAP), Discrete Multitone Transmission (DMT), and Frequency Division Multiplexing (FDM) may also be included as modulation techniques employed to generate the modulated data signal to transport content through operating environment 100 of FIG. 1.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Consumers 110-112 include end-users and other types of consumers of broadcast content. Consumers 110-112 may employ virtually any computing device capable of receiving content over a network, such as network 108, from another computing device, such as from service provider 102.

Consumers 110-112 may also employ any computing device capable of receiving the content employing other mechanisms, including, but not limited to CDs, DVDs, tape, electronic memory devices, or the like. The set of such devices may include devices that typically connect using a wired communications medium such as personal computers, multiprocessor systems, microprocessor-based or programmable consumer electronics, network PCs, or the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or the like. Consumers 110-112 may also employ any device that is capable of connecting using a wired or wireless communication medium such as a PDA, POCKET PC, wearable computer, and any other device that is equipped to communicate over a wired and/or wireless communication medium to receive and play content. Similarly, Consumers 110-112 may further employ an audio system, a jukebox, television appliances, digital recorders, set-top boxes (STB), video display device, or the like.

Consumers 110-112 may receive the content as scrambled/encrypted and employ a conditional access control component to decrypt content, and/or enable revocation of an access entitlement and/or right associated with content. For example, Consumers 110-112 may receive content decryption keys, service keys, entitlements and/or rights, or the like. Moreover, Consumers 110-112 may employ a smart card, such as a virtual smart card, or the like, to manage access to and decryption of the content.

Consumers 110-112 may request broadcast content delivered directly from service provider 102 or at any point along a market stream (e.g., such as an upstream content owner, not shown). Moreover, although not shown, consumers 110-112 may receive content from multiple service providers. In addition, Consumers 110-112 may communicate interactively upstream to service provider 102.

Illustrative Secure Transitioner

Figure 2:
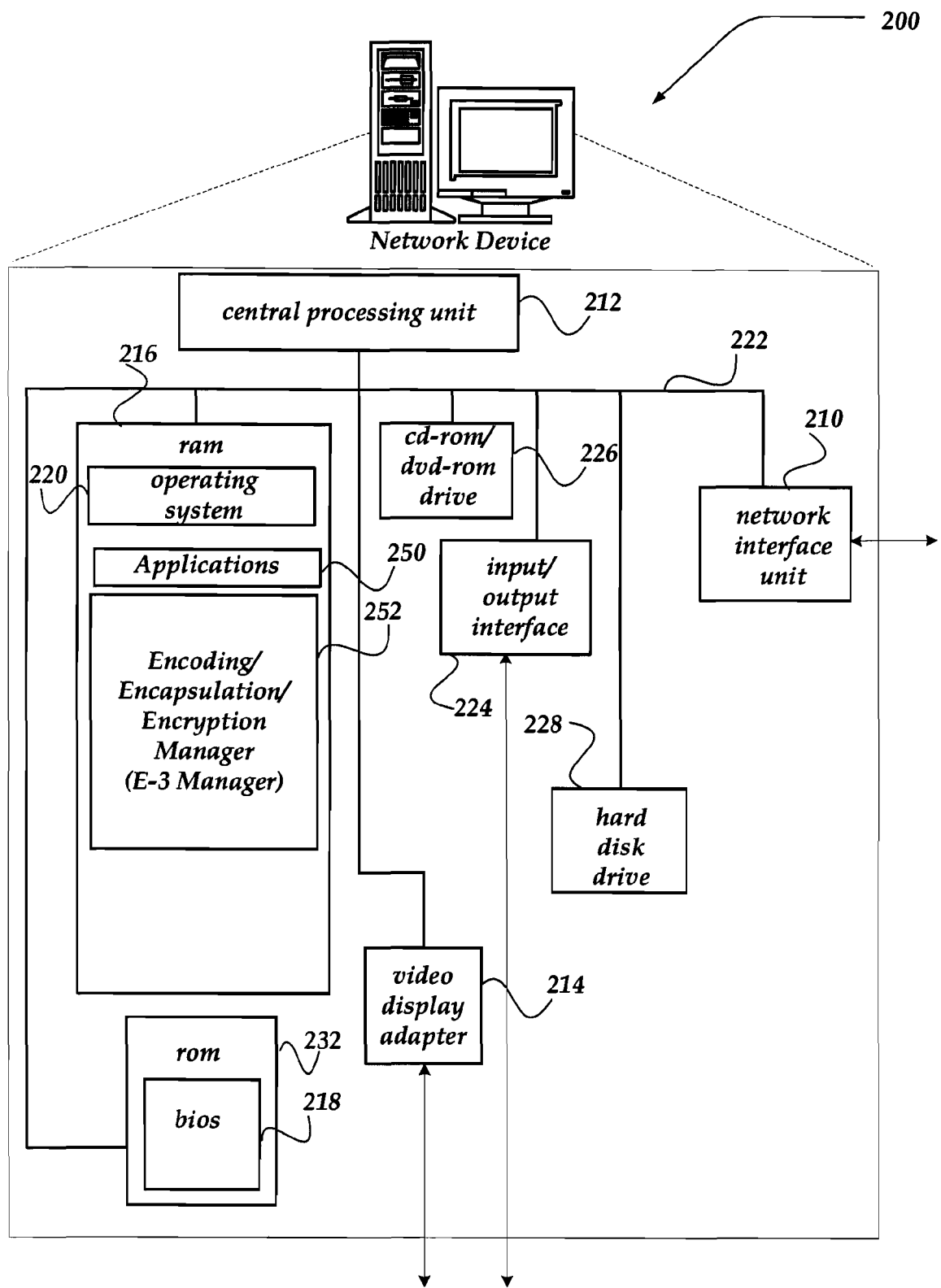
FIG. 2 is a functional block diagram of an embodiment of a secure appliance useable for transcoding between broadcast information and secure IP information.

FIG. 2 shows one embodiment of a network device, according to one embodiment of the invention. Network device 200 may include many more or less components than those shown. The components shown, however, are sufficient to disclose an illustrative embodiment for practicing the invention. Network device 200 may, for example, represent secure transitioner 106 of FIG. 1. In one embodiment, network device 200 may operate as a multifunctional convergences appliance with security to perform transcoding of various input signals, as described further below.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 may also enable communicating of transcoded content, such as encrypted MPEG content, an IP encrypted steam, or the like. Network interface unit 210 is sometimes known as a transceiver, transceiving device, network interface card (NIC), or the like.

Network device 200 may also include an SMTP handler application for transmitting and receiving email. Network device 200 may also include an HTTP handler application for receiving and handing HTTP requests, and an HTTPS handler application for handling secure connections. The HTTPS handler application may initiate communication with an external application in a secure fashion.

Network device 200 also may include input/output interface 224 for communicating with external devices, such as a mouse, keyboard, scanner, or other input devices not shown in FIG. 2. Moreover, input/output interface 224 may also be configured to receive various input signal formats using a variety of connector types. Thus, for example, input/out interface 224 may be configured to connect using BNC connectors, Digital Visual Interface (DVI) connectors, Unified Display Interface (UDI) connectors, Apple Display Connectors (ADC), High-Definition Multimedia Interface (HDMI), RJ45 connectors, DVB, or the like. Input/output interface 224 may so receive various types of content including, but not limited to DVB, ATSC, SDI, S-Video, AESiEBU, S/PDIF, MPEG Transport over Asynchronous Serial Interface (ASI), or the like. Similarly, input/output interface 224 may also be configured to provide secure transcoded content using any one or more of the above connectors and/or formats.

Network device 200 may further include additional mass storage facilities such as CD-ROM/DVD-ROM drive 226 and hard disk drive 228. Hard disk drive 228 is utilized by network device 200 to store, among other things, application programs, databases, or the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, transcoders, database programs, word processing programs, spreadsheet programs, and so forth. Mass storage may further include applications such Encoding/Encapsulation/Encryption Manager (E-3) manager 252.

E-3 manager 252's operations are described in more detail below in conjunction with FIG. 3. Briefly, however, E-3 manager 252 is configured to receive various types of content, such as broadcast content, and to securely transcode the content for securely communicating the content over IP. As such, E-3 manager may receive content in one format, and encode, encapsulate, and/or encrypt the content into another format for use over an IP based network. E-3 manager 252 may employ a process such as described below in conjunction with FIG. 3 to perform at least some of its actions.

E-3 manager 252 may, for example, receive content from a DVB source, a video and/or audio source, or even a network source. Then, based on how E-3 manager 252 is configured, the content may be transcoded for use by a digital cable TV, a digital terrestrial broadcast system, IPTV, or other consumer device, such as described above in conjunction with FIG. 1. E-3 manager 252 may employ such formats as MPEG TS, DVB transport streams, MPEG TS over IP, or even an IP based media format as an output.

For example, E-3 manager 252 may receive content in one format, such as MPEG, and transcode an MPEG transport stream from the content into an IP transport stream. MPEG data streams include packetized elementary streams (PES), which typically include fixed (or variable sized blocks of an integral number of elementary streams (ES) access units. An ES typically is a basic component of an MPEG data stream, and includes digital control data, digital audio, digital video, and other digital data (synchronous or asynchronous). A group of tightly coupled PES packets referenced to substantially the same time base comprises an MPEG program stream (PS). Each PES packet also may be broken into fixed-sized transport packet known as MPEG Transport Streams (TS) that form a general-purpose approach of combining one or more data streams, possible including independent time bases. The MPEG TS may be employed over a wide variety of broadcast media, such as DVB.

MPEG TS is so called, to signify that it is an input to a Transport Layer in the ISO Open Systems Interconnection (OSI) seven-layer network reference model. MPEG TS relies on underlying layers to ensure reliable delivery of the transported data. The underlying layers of the MPEG TS may not be compatible with IP-based network communications. Therefore, E-3 manager 252 enables transcoding of the underlying TS layers.

E-3 manager 252 may also be configured to receive a broadcast stream and to determine the format of the broadcast stream. If the data stream is to be transcoded to an IP-based stream, E-3 manager 252 may de-capsulate the broadcast stream in preparation for transcoding it to an IP-based data stream. Decapsulation of broadcast content may include removal of format headers, and the like on a data stream to reveal a transport stream and program stream.

If E-3 manager 252 determines that the broadcast stream is to be retained, E-3 manager 252 may be enabled to provide an IP-based envelope to the broadcast stream. E-3 manager 252 may also configured to receive content and to determine if the content is to be decapsulated (or encapsulated) to enable DVB, ATSC formatted broadcast of the content.

E-3 manager 252 may provide an interface, such as a user interface, to enable selection of input signals, selection of processing to be performed upon the selected input signals, and/or selection of a format for an output signal.

E-3 manager 252 may provide an interface that enables selection of an input signal based on an input connection to input/output interface 224, and/or network interface unit 210. For example, if a single input signal of broadcast content is connected to input/output interface 224, then a selection might be to employ that signal as the input signal. In one embodiment, an auto-detection mechanism may be employed to determine a selection of the input signal(s). However, E-3 manager 252 may also enable an interface that provides for selection of multiple signals, from a variety of sources, including but not limited to ASI, video base band, DVB, IP, or the like.

E-3 manager 252 may provide an interface that enables selection of various processing that may be performed upon the received input signal. For example, E-3 manager 252 may enable PID filtering, rate shaping, and/or encryption processes to be performed. In PID filtering, E-3 manager 252 may enable an administrator to select from a variety of program streams within the input signal based on, for example, a Program Identifier (PID). However, the invention is not limited to selection based on PIDs, and other mechanisms may also be employed.

Rate shaping may be selected to enable, for example, an administrator to change a rate of the input signal to another rate. For example, an input signal may be received at 8 Mbits, and transrated (or rate shaped) to 4 Mbits, or the like. Moreover, rate shaping may further enable such actions on the input signal, including, but not limited to, compression/decompression, encoding/decoding, or the like. Thus, virtually any shaping of the input signal may be selected and performed using E-3 manager 252.

E-3 manager 252 may provide an interface that enables selection of encryption to be performed on the signal. Encryption of the signal may be performed using any of a variety of encryption mechanisms to generate encrypted content, including, but not limited to RSA algorithms, Data Encryption Standard (DES), Diffie-Hellman, International Data Encryption Algorithm (IDEA), Skipjack, RC4, Advanced Encryption Standard (AES), Elliptic Curve Cryptography, or the like. Selective encryption may also include use of X.509 encryption keys and certificates.

E-3 manager 252 may also selectively encrypt at least a portion of the content leaving another portion unencrypted (e.g., in the clear). E-3 manager 252 may selectively encrypt one portion of the content using one encryption technique, and another portion of the content using a different encryption technique. E-3 manager 252 may further employ different content encryption keys (CWs) for different portions of the selectively encrypted content.

For example, where the output is MPEG, E-3 manager 252 may select to encrypt a video elementary stream (ES), an audio ES, a digital data ES, and/or any combination, and/or any portion of video, audio, data elementary streams to generate encrypted content. E-3 manager 252 may further select to encrypt at least a portion of an I-frame, P-frame, B-frame, and/or any combination of P, B, and I frames. Moreover E-3 manager 252 may perform such encryption on-the-fly.

E-3 manager 252 may also configured to communicate information with access manager 104 (shown in FIG. 1) to provide selective access authority to content. For example, E-3 manager 252 may receive a consumer's public encryption key to enable encryption of the program stream such that only that consumer may decrypt it. Moreover, E-3 manager 252 may employ a common format such that the encrypted content may employ more than one access manager.

E-3 manager 252 further enables selection of the output signal format. In one embodiment, the selection may be based on auto-detection of a type of connection being used to input/output interface 224, and/or network interface unit 210. In another embodiment, an administrator may select the output signal type, using the interface. Such output signal types, include, but are not limited to those described above, including for an encrypted digital SDI signal.

Generalized Operation

The operation of certain aspects of the invention will now be described with respect to FIG. 3. FIG. 3 is a flow diagram generally showing an embodiment of a process 300 for enabling the transition to secure IP communications.

As described above, the invention is configured to enable transcoding of a variety of signals. In one embodiment, the selection of which operations to be performed may be E3 is capable of solving various convergence problems. The specific operation of the system is achieved through a control interface that may be accessed through a variety of mechanisms, including, a graphical user interface (local GUI). In one embodiment, the GUI is displayed local to the or through a remote network appliance. In another embodiment, the GUI may be displayed remote through a network interface. The control is divided into 3 sections: Input control, Processing control and Output control.

Figure 3:
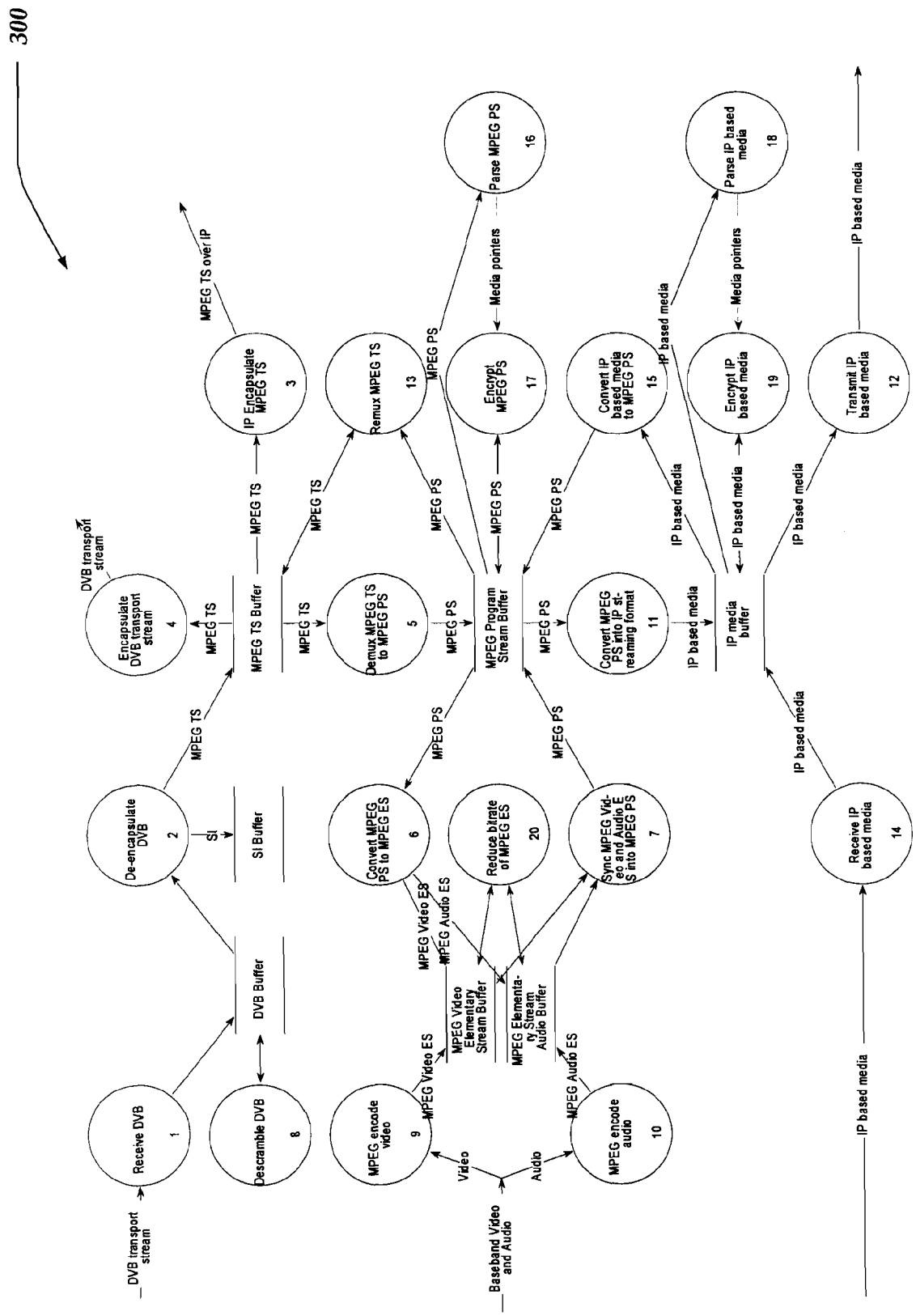
FIG. 3 is a flow diagram generally showing an embodiment of a process for enabling the transition to secure IP communications, in accordance with aspects of the present invention.

In describing process 300 of FIG. 3, the following Backus-Naur form (BNF) notations may be employed.

The following is an example of the control interface in BNF notation.

Input Control={Analog|Digital|DTV|IP}, indicates that the input control may be an analog signal OR a digital signal OR a DTV signal OR an IP signal. Thus, the "|" indicates an OR selection.

Analog=Analog Video+Analog Audio, indicates that the analog signal includes both an analog video signal AND an analog audio signal. Thus, the "+" indicates an AND selection.

Analog Video={Composite|S-video|Component}, indicates that the analog video signal may be a composite signal OR an S-video signal OR a component signal. However, it should be clear that other formats may also be employed.

Analog Audio={RCA|AES/EBU}, indicates that the analog audio signal may be in an RCA format OR an AES/EBU format. However, it should be clear that other formats may also be employed.

Digital=Digital Audio+Digital Video.

Digital Video={SDI|Serial Digital Transport Interface (SDTI)|Firewire|USB}. However, any of a variety of other digital video signal formats or types may also be employed.

Digital Audio={SP/DIF|AES/EBU|Embedded}. Other formats may also be employed, without departing from the scope or spirit of the invention.

IP={UDP/RTP|UDPiRTP Multicast|HTTP/HTTPSiFTP/mms|RTSP}.

Processing Control={Encode/Transcode+Encapsulate+Encrypt}. However, other processing controls may be included without departing from the scope or spirit of the invention.

Encode/Transcode={Video encode|Audio encode}

Video encode={Video CODEC+video bitrate}, where in one embodiment, the video bitrate is an integer value.

Audio encode={Audio CODEC+audio bitrate}, wherein in one embodiment, the audio bitrate is an integer value.

Video CODEC={None|MPEG-2|MPEG-1|MPEG-4|H.264|H.263|WMV|DV|Other}. However, other CODECs may also be employed without departing from the scope of the invention.

Audio CODEC={None|mpga|mpg2a|mp3|mp4a|Other}. However, other formats may also be employed.

Encapsulate={MPEGTS|MPEGPS|MPEG1|ASF|Ogg|-MP4|MOV|Wav|Raw}. It should be clear that the provided list is a non-exhaustive list, and other formats may also be employed.

Encrypt={Encrypt level|Key Control}
Encrypt level={IP|MPEG}
Key Control={Reuse|Generate}
Output Control={HTTP|MMSH|RTP|UDP|RTSP}.

As shown above, the various content formats are intended to be non-exhaustive lists, and are therefore provided as merely examples. Other formats may be includes or even replace those that are presently illustrated, without departing from the scope of the invention.

Selections for the various operations may be divided into three sections: selecting one or more input signals, processing selections, and selecting of types of output signals.

The Input control allows the user to select one of the physical inputs of the system and specify the format of the signal to be received. The Processing control allows the user to specify the sort of transcoding and encapsulation to be performed on the signal. The Output control specifies which physical outputs will be enabled and what format signal will be transmitted from them.

FIG. 3 includes one embodiment of a Yourdon flow diagram of process 300 that may occur within the secure transitioner 106 of FIG. 1. Each bubble represents a data transform or subprocess. Each arrow represents a dataflow. Parallel lines represent data stores, such as "DVB Buffer."

In the follow description, bubble labels are in parentheses, e.g. (15) means "Convert IP based media to MPEG PS."

If the Input Control=DTV then the signal may be processed by "Receive DVB" (1). It autodetects the standard of the DTV signal ATSC or DVB and the specific packet format. It then buffers packets into the "DVB Buffer." Any packets arriving in the DVB Buffer are descrambled by the "Descramble DVB" process (8). This process receives entitlements from EMMs multiplexed in the DTV signal or from a connection to a key manager (such as access manager 104 of FIG. 1). The descrambled DTV packets may, in one embodiment, be placed back in the "DVB Buffer" overwriting the original. Each clear packet is flagged as decrypted through the setting of a single bit in the packet header. The clear packets in the buffer are then de-encapsulated by the "De-encapsulate DVB" process (2) which removes the DVB header and separate system information (SI) from the MPEG transport stream packets which are stored in their respective buffers.

If the Input Control=Analog | Digital then the signal will be processed by "MPEG Encode Video" (9) and "MPEG Encode Audio" (10). It should be understood that these processes are merely illustrative of a wealth of CODECs that can be chosen, and others may be employed, without departing from the scope of the invention. The CODECs capture and compress the baseband signal into the "MPEG Video Elementary Stream buffer" and the "MPEG Audio Elementary Stream buffer." If the signal is already compressed as might be if the input signal is SDTI, or the like, then the CODEC and bitrate settings control the re-compression of the signal performed by "Reduce bitrate of MPEG ES" (20). The audio and video elementary streams are then synchronized and multiplexed into a program stream and stored in "MPEG Program Stream buffer."

If the Input Control=IP then the signal may be received through the IP input by (14) and media packets will be buffered in the "IP media buffer." "Receive IP based media" will also decrypt secure content using entitlements received from an external source.

If the Processing Control is set so that the Video CODEC and the Audio CODEC are set to 'None' then the content received is not compressed. If the settings other than 'None' are selected then content is either compressed (9), (10) or recompressed (20) to the specified bitrate and CODEC. If the incoming signal was source from the DTV or IP inputs would be first converted to MPEG program streams using either (5) or (15), then the recompression is performed, from the "MPEG Program Stream Buffer" through (5), (6), (20) and (7).

If the Processing Control is set such that Encrypt level=IP then IP packets in the "IP media buffer" are encrypted using (18) and (19). Alternatively, if the Processing Control is set such that Encrypt level=MPEG then MPEG PS packets in the "MPEG program stream buffer" are encrypted using (16) and (17). The packets are parsed according the content format to find the packets containing the essential audio and video data. These packets are selected for encryption. If the Key Control=Generate then the encrypting process uses, in one embodiment, a new service key. If the Key Control=Reuse then the encrypting process reuses the original service key received in the entitlement to the content by (1) or by (14). The service key is used to encrypt the ECM stream that is then multiplexed into the encrypted content stream. The ECM is typically a packet which includes information to determine a control word (CW) for use in decrypting the content. In this approach, streaming content may be encrypted using the CW. The CW may be encrypted with a service key and stored in the ECM message. The encrypted content, including the ECM may then be provided by multiplexing the ECMs with the encrypted content stream.

The service key may also be encrypted using an encryption key that may be specific to a user, and sent to the user within a message frame, packet, or the like. For example, the service key may be sent within an Entitlement Management Message (EMM). The EMM may also include additional information such as subscription information, or the like, associated with a user. For example, the EMM may include information that indicates whether the user has a right to access the decrypted content, possible constraints upon the access, or whether such access right is revoked. In one embodiment, the EMMs may also be provided with the encrypted content stream. In another embodiment, the EMMs may be provided to a downstream recipient, such as consumers 110-112 of FIG. 1, distinct from the encrypted content stream. For example, the EMMs may be provided out-of-band from the content, but using a substantially similar output signal format, or wire.

Multiple outputs can be simultaneously enabled using (3) to output "MPEG TS over IP" or (4) to output a DVB transport stream or (12) to output "IP based media" to the Internet. This allows the system to receive content and simultaneously retransmit the content into distribution pipes.

It will be understood that each bubble of the flow illustration, and combinations of bubbles in the flow illustration, can be implemented by computer program instructions. These program instructions may be provided to a processor to produce a machine, such that the instructions, which execute on the processor, create means for implementing the actions specified in the flow bubble or bubbles. The computer program instructions may be executed by a processor to cause a series of operational steps to be performed by the processor to produce a computer implemented process such that the instructions, which execute on the processor to provide steps for implementing the actions specified in the flow bubble or bubbles.

Accordingly, bubbles of the flow illustration support combinations of means for performing the specified actions, combinations of steps for performing the specified actions and program instruction means for performing the specified actions. It will also be understood that each bubbles of the flow illustration, and combinations of bubbles in the flow illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for managing content over a network, comprising:

a input/output interface that is configured to receive input signals including at least one of a IP signal, MPEG Transport over ASI, a DVB signal, an SDI signal, an S-video signal, an AES/EBU signal, or an S/PDIF signal, and to provide an output signal including at least one of a DVB signal, an ATSC signal, an IP signal;

a processor in communication with a display and the input/output interface; and a memory in communication with the processor and for use in storing data and machine instructions that causes the processor to perform a plurality of actions, including:

determining an input signal selection;

enabling a selection of a processing action on the input signal, including at least one of filtering of a program stream, rate shaping, encoding, encapsulation, or encryption of the input signal, wherein rate shaping further comprises transcoding of a bit rate of the input signal by decrypting the input signal, employing a service key inside of an EMM to decrypt an ECM to access a first Control Word key, varying a bit rate on the decrypted signal, and re-encrypting the bit rated signal using a second Control Word key, and further encrypting the second Control Word key using the same service key;

determining an output signal format selection; and converting the processed input signal into the determined output signal selection.

2. The network device of claim 1, wherein the input signals, and the output signals are obtained through industry standard connections.

3. The network device of claim 1, wherein the encoding employs a multimedia CODEC that employs at least one of video or an audio CODEC, including at least one of an MPEG CODEC, H.264 CODEC, a WMV CODEC, a DV CODEC, or an MPGA, MPG2A, MP3, or MP4A CODEC.

4. The network device of claim 1, wherein the display enables a user to provide a selection of the processing action.

5. The network device of claim 1, wherein the processing further comprises receiving a baseband video or audio signal; digitizing, encoding, and compressing the signal into an elementary stream.

6. The network device of claim 5, wherein the compressed audio and video signals are synchronized and multiplexed into a program stream using the selected process.

7. The network device of claim 5, wherein the processing action is further configured to recompress the elementary stream into another elementary stream with a different bit rate.

8. A system useable in securely transitioning television signals to IP signals, comprising:

a device configured to provide a television signal; and a secure transitioner that is operative to perform actions, comprising:

receiving the television signal;

determining a format of the received television signal;

enabling a selection of a processing action on the television signal, including at least one of filtering out a program stream, rate shaping, encoding, encapsulation, or encryption of the television signal, wherein the television signal is a digital TV (DTV) signal, and the processing comprises descrambling the DTV signal using a key, and de-encapsulating the descrambled DTV signal to expose an MPEG transport stream;

determining an output signal format; and converting the processed television signal into the determined output signal, for use of an IP based network.

9. The system of claim 8, wherein the processing further comprises multiplexing MPEG program streams into MPEG transport streams.

10. The system of claim 8, wherein rate shaping further comprises varying a bit rate on the television signal.

11. The system of claim 8, wherein the secure transitioner that is operative to perform actions, further comprising:

receiving baseband audio and video input signals;

digitizing the received baseband audio and video signals;

encrypting the digitized signals; and providing the encrypted signals in SDTI format useable with a digital video tape device.

12. An apparatus for securely transitioning television input to an IP based network, comprising:

a input/output interface that is configured to receive input signals including at least one of a IP signal, MPEG Transport over ASI, a DVB signal, an SDI signal, an S-video signal, an AES/EBU signal, or an S/PDIF signal, and to provide an output signal including at least one of a DVB signal, an ATSC signal, an IP signal;

means for determining an input signal selection;

means for selecting a processing action, wherein the processing actions comprise at least one of filtering the input signal, rate shaping the input signal, encapsulating the input signal, or encrypting the input signal;

means of securely performing the selected processing action, wherein the processing action is performed upon the received input signal, wherein the processing comprises receiving a baseband video or audio signal, digitizing, encoding, and compressing the signal into an elementary stream, and wherein the processing action is configured to recompress the elementary stream into another elementary stream with a different bit rate; and means for converting the received input signal into a selected output signal useable over the IP based network.

13. A system useable in securely transitioning television signals to IP signals, comprising:

a device configured to provide a television signal; and a secure transitioner that is operative to perform actions, comprising:

receiving the television signal;

determining a format of the received television signal;

enabling a selection of a processing action on the television signal, including at least one of filtering out a program stream, rate shaping, encoding, encapsulation, or encryption of the television signal, wherein rate shaping further comprises varying a bit rate on the television signal;

determining an output signal format; and converting the processed television signal into the determined output signal, for use of an IP based network.

* * * * *

UNITED STATES PATENT AND TRADEMARK OFFICE
CERTIFICATE OF CORRECTION

PATENT NO. : 7,817,608 B2  Page 1 of 1
APPLICATION NO. : 11/470574
DATED : October 19, 2010
INVENTOR(S) : Reza P. Rassool et al.

It is certified that error appears in the above-identified patent and that said Letters Patent is hereby corrected as shown below:

In column 6, line 66, delete "AESiEBU," and insert -- AES/EBU, --, therefor.

In column 10, line 12, delete "UDPiRTP" and insert -- UDP/RTP --, therefor.

In column 10, line 12, delete "HTTP/HTTPSiFTP" and insert -- HTTP/HTTPS/FTP --, therefor.

Signed and Sealed this
Twenty-sixth Day of April, 2011

David J. Kappos
*Director of the United States Patent and Trademark Office*